United States Patent Office 3,560,228
Patented Feb. 2, 1971

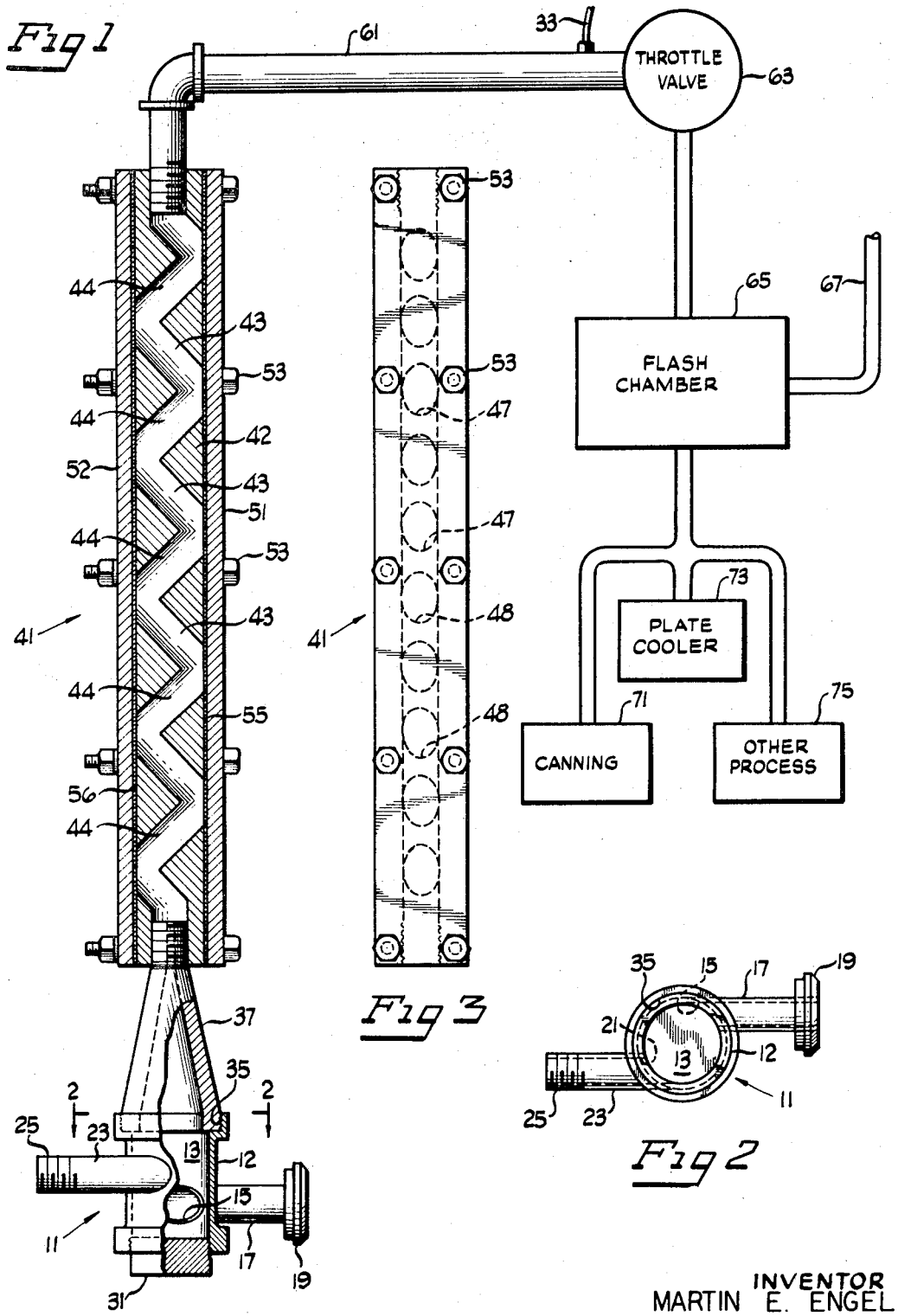

3,560,228
METHOD FOR HEATING HEAT SENSITIVE FLUIDS
Martin E. Engel, Park Ridge, Ill., assignor to Kraftco Corporation, a corporation of Delaware
Original application Oct. 5, 1965, Ser. No. 493,162, now Patent No. 3,450,022, dated June 17, 1969. Divided and this application Dec. 31, 1968, Ser. No. 788,164
Int. Cl. A23c 3/02
U.S. Cl. 99—212                             3 Claims

ABSTRACT OF THE DISCLOSURE

A method for subjecting heat sensitive liquids to high temperature short-time treatment. The method is effected by combining a heated gas with the heat sensitive liquid in a particular manner to effect thorough and uniform mixing of the gas in the heat sensitive liquid.

---

This is a division of a co-pending application entitled "Steam Infuser," Ser. No. 493,162, filed Oct. 5, 1965, which has now issued as United States Letters Patent No. 3,450,022.

This invention relates to high temperature short time treatment of liquids and, more particularly, to an improved steam infuser for subjecting a heat sensitive liquid to high temperature short time treatment.

High temperature short time treatment of liquids is a step frequently used in connection with the processing of heat sensitive liquids such as milk. One process in which high temperature short time treatment of skim milk is utilized is disclosed in U.S. Pat. No. 3,361,567, issued Jan. 2, 1968 and assigned to the assignee of the present invention. High temperature short time treatment of liquids may also be used in other processes, for example, to sterilize a liquid for canning.

One technique for accomplishing high temperature short time treatment of heat sensitive liquids is to utilize apparatus which infuses steam into the liquid, holding the mixture of steam and liquid for a short time, and then separating the steam from the liquid. The steam heats the liquid quickly and the liquid is quickly cooled when the steam is removed. Apparatus for infusing steam into the liquid is known as a steam infuser. It is incumbent that the steam infuser uniformly distribute steam in the heat sensitive liquid, otherwise, some portions of the liquid may become overheated while others are not heated sufficiently. Naturally, it is also desirable that the steam infuser be of simple sturdy construction and be easily cleaned.

It is an object of this invention to provide an improved steam infuser for subjecting a heat sensitive liquid to high temperature short time treatment.

Another object of the invention is to provide a steam infuser which achieves a uniform distribution of steam in a heat sensitive liquid for uniform heating thereof.

Still another object of the invention is to provide a steam infuser which is simple and sturdy of construction and which is readily disassembled and cleaned.

Other objects and the various advantages of the invention will become apparent to those skilled in the art from the following description taken in connection with the accompanying drawings wherein:

FIG. 1 is a partially schematic, partially elevational and partially sectioned view of a system for processing a heat sensitive liquid and wherein a steam infuser in accordance with the invention is utilized;

FIG. 2 is an end view of the injector nozzle of the steam infuser of FIG. 1 taken along the line 2—2 therein; and FIG. 3 is an elevational view of a portion of the steam infuser of FIG. 1, rotated 90 degrees from the position shown in FIG. 1.

The steam infuser of the invention includes an injector nozzle 11 for providing a pressurized supply of heat sensitive liquid and steam. A fluid conductor 41 is coupled to the nozzle and has an elongated fluid conducting passage therein through which steam and heat sensitive liquid from the nozzle flow. The passage is formed in a substantially zigzag pattern to have a plurality of turns therein. This creates turbulence in the fluids passing through the passage to effect thorough and uniform mixing of steam in the heat sensitive liquid.

In accordance with the invention, the fluid conductor may comprise a center portion having a plurality of substantially straight elongated parallel first holes therein, and a plurality of substantially straight elongated parallel second holes therein. The second holes extend transversely of the first holes and intersect the first holes at opposite outside surfaces of the center portion to form a plurality of openings along such opposite surfaces of the center portion. A pair of plates, each secured to a respective opposite surface of the center portion, are provided to cover the openings in the opposite surfaces of the center portion and to cooperate with the first and second holes to form the zigzag passage for steam and heat sensitive liquid.

In order to more particularly associate the invention with a practical process in which it may be utilized, the process disclosed in U.S. Pat. No. 3,361,567, previously cited, will be summarized. Although the invention may be utilized in this process, it is to be understood that the invention is not limited to use in this process but has application to many processes associated with heat sensitive liquids.

The process disclosed in U.S. Pat. No. 3,361,567 is for recovering milk protein from milk. The milk fat is first removed from the milk to provide a skim milk. The skim milk is then subjected to a preliminary heat treatment. The solids of the skim milk are then increased to between 10 and 35 percent solids and the resultant liquid is subjected to a high temperature short time treatment. In this connection, the skim milk is heated to at least 280° F. for 15 seconds and preferably, to 285° to 295° F. for 20 seconds. Of course, equivalent time and temperature conditions may be utilized for the high temperature short time treatment.

The heat treated skim milk is then reduced in temperature to about 215° F. and is acidified by the addition of an acid under turbulent conditions so as to assure uniform distribution of the acid in the skim milk. The skim milk, after acid addition, forms into curd and whey with the whey protein co-precipitating with the casein to provide a handleable curd. The curd and whey are then separated and the curd may be continuously roll pressed on a conveyor and simultaneously and subsequently washed. The curd may then be ground in the presence of added water to very small particle size and the resultant dispersion of milk protein particles is centrifuged from the aqueous phase. The milk protein is then ready for drying or further processing.

The steam infuser of the invention may be utilized to perform the step of high temperature short time treatment of the skim milk in the process just described. The steam infuser of the invention includes a nozzle 11 comprising a substantially cylindrical housing 12 defining a chamber 13. An orifice 15 opens into the chamber 13 tangentially of the walls thereof and is the interior terminus of a liquid feed injection tube 17.

A second orifice 21 opens into chamber 13 tangentially of the walls thereof and represents the inner terminus of a tube 23. Tube 23, which extends from the housing 12 of nozzle 11, is provided with suitable connecting means 25 for connecting the tube 23 with a source of steam, not shown.

The one end of chamber 13 is closed by a plug 31 screwed into housing 12. Plug 31 may be removed for cleaning nozzle 11. The other end of nozzle 11 is provided with an axial opening 35 in which a conical pipe 37 is threadably secured.

Pipe 37 conducts the fluid mixture of steam and skim milk into a fluid conductor 41. Conductor 41 has a center portion 42 in which are drilled a plurality of elongated substantially straight mutually parallel holes 43. A further plurality of substantially straight elongated mutually parallel holes 44 are bored in center portion 42 and extend transversely of holes 43. The center lines of holes 43 intersect the center lines of holes 44, respectively, at points lying in the planes of opposite surfaces of the center section 42. As a result, a plurality of openings 47 and 48 are left on opposite surfaces, respectively, of the center portion 42.

A pair of plates 51 and 52 are secured by bolts 53 over the respective sets of holes 47 and 48, respectively, and against the center portion 42. Sealing Teflon gaskets 55 and 56 are sandwiched between the plates and the center portion 42. When secured over the openings 47 and 48, plates 51 and 52, together with the walls of the holes 43 and 44, form a zigzag fluid conducting passage which has a plurality of substantial turns therein. This creates considerable turbulence in the fluid mixture of steam and heat sensitive liquid passing through the fluid passage to effect a thorough and uniform mixing of the steam in the heat sensitive liquid.

Fluid leaving the fluid conductor 41 is conducted through a holding tube 61 which comprises a straight tube of a length sufficient to hold the mixture of steam and liquid for a desired period of time. A throttle valve or back pressure valve 63 is provided at the far terminus of holding tube 41 for maintaining a desired pressure in the holding tube, in the fluid conductor 41, in the pipe 37, and in the chamber 13 of nozzle 10. A thermocouple 33 may be provided in tube 41 just prior to valve 63 for indicating the mixture temperature. The mixture of steam and liquid leaving throttle valve 63 may then be injected into a flash chamber 65 for separating the steam from the liquid. Separated steam is removed through conduit 67 while the heat treated liquid may then be removed and be processed in any desired way. For example, the liquid may be canned as shown at 71 since it will have been sterilized by the high temperature short time treatment. Alternatively, the liquid may be plate cooled as at 73, or may be processed in some other way as represented by 75.

In operation, steam is injected into the chamber 13 of nozzle 11 through pipe 23 while liquid is injected into chamber 13 of nozzle 11 through pipe 17. The tangential placement of the orifices 15 and 21 causes the steam and liquid to swirl about in chamber 13 under pressure. This pressure causes a flow of the steam and liquid mixture into the fluid conductor 41 wherein the considerable turbulence produced by the zigzag course fluid conducting passage therein thoroughly mixes and diffuses the steam in the liquid in a uniform distribution. Although the legs of the fluid conducting passage in fluid conductor 41 are coplanar, it is not necessary that such be the case. The zigzag course which the passage follows may extend in a three dimensional fashion as well as only two dimensions as shown.

As previously mentioned, it is incumbent that the steam infuser uniformly distribute the steam in the heat sensitive liquid to prevent overheating of some portions of the liquid while other portions are heated insufficiently. By utilizing the construction of the invention, as shown and described, it has been found that sufficient uniformity in the infusing of steam into the liquid occurs such that substantially superior results are attained over methods previously attempted.

In order to clean the steam infuser, the various threaded parts may be disengaged to separate the nozzle 11 from the pipe 37 and the fluid conductor 41. Fluid conductor 41 may then be disassembled by removing bolts 53 and 54 and separating plates 51 and 52 from the center portion 42. Ready access may then be had to holes 43 and 44 and a straight brush or similar cleaning device may be inserted in the holes through the openings 47 and 48. Thus simple an effective cleaning of the device may be effected. All that need be accomplished in reassembling the device is that the plates 51 and 52 be repositioned, the belts tightened, and the nozzle 11 and pipe 37 screwed back in place.

It may therefore be seen that the invention provides an improved steam infuser for subjecting a heat sensitive liquid to high temperature short time treatment. The steam infuser achieves a uniform distribution of the steam in the heat sensitive liquid for uniform heating thereof, and is simple and sturdy of construction and readily disassembled and cleaned.

Other embodiments of the invention and modifications thereof will be apparent, from the foregoing description and accompanying drawings, to those skilled in the art, and such embodiments and modifications are intended to fall within the scope of the appended claims.

What is claimed is:

1. A method for uniformly heating a heat sensitive liquid with steam so as to subject the heat sensitive liquid to high temperature short time heat treatment comprising, combining the heat sensitive liquid with steam in a chamber, said combining being effected by tangential injection of separate streams of steam and the heat sensitive liquid through tangential orifices into said chamber, said combining causing the steam and the heat sensitive liquid to swirl about in said chamber under pressure, providing a fluid conductor having an elongated zigzag passage therein and subjecting the swirling combination of heat sensitive liquid and steam to turbulent flow conditions so as to effect thorough and uniform mixing of steam in the heat sensitive liquid, said turbulent flow conditions being provided by conducting the swirling combination of heat sensitive liquid and steam from said chamber to said fluid conductor and causing the swirling combination of steam and the heat sensitive fluid to be subjected to a substantially zigzag course by passage through the elongated zigzag passage in said fluid conductor.

2. The method of claim 1 wherein said heat sensitive liquid is skim milk.

3. The method of claim 2 wherein said skim milk is subjected to high temperature short time conditions wherein the temperature and time are at least equivalent to 280° F. for 15 seconds.

References Cited

UNITED STATES PATENTS

| | | | |
|---|---|---|---|
| 1,789,738 | 1/1931 | Gane | 99—251X |
| 2,452,260 | 10/1948 | Peebles | 99—216X |
| 2,838,288 | 6/1958 | Stoelting et al. | 99—252X |
| 2,870,028 | 1/1959 | Anderson et al. | 99—251X |
| 2,909,985 | 10/1959 | Abrams | 99—251 |
| 3,119,704 | 1/1964 | Harrell et al. | 261—75X |
| 3,230,095 | 1/1966 | Stewart, Jr. | 99—251 |
| 3,361,567 | 1/1968 | Engel et al. | 99—20 |

TIM R. MILES, Primary Examiner

U.S. Cl. X.R.

99—216, 251, 252; 261—78